United States Patent Office 3,174,980
Patented Mar. 23, 1965

3,174,980
PROCESS FOR PRODUCING A SOLID CRYSTALLINE STABLE COMPLEX OF BROMINE AND 2-PYRROLIDONE
Wiley Edgar Daniels, Easton, Pa., assignor to General Aniline & Film Corporation, New York, N.Y., a corporation of Delaware
No Drawing. Filed Apr. 27, 1962, Ser. No. 190,796
1 Claim. (Cl. 260—326.5)

The present invention relates to a method of producing a novel, stable complex of bromine and lactams of 5–7 cyclic atoms, which have been found useful as solid compositions of matter capable of supplying free bromine for use in carrying out chemical reactions or as germicides or disinfectants.

While bromine has long been recognized as an effective germicide, fungicide, and disinfectant, its use for these purposes has been quite restricted because of its high corrosive and toxic nature. I have now discovered that bromine can be complexed with lactams so as to produce novel compounds containing 32–36% available bromine, which are crystalline solid materials and which possess good storage stability.

Tafel and Wassmuth reported (Berichte, 1907, vol. 40, p. 2835) that 2-pyrrolidinone and bromine will react at approximately 0° C. in chloroform and formulated the reaction as follows:

(I)
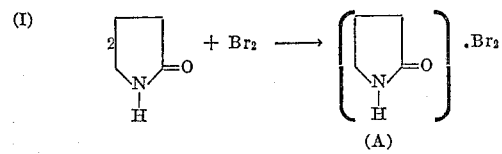

(II)
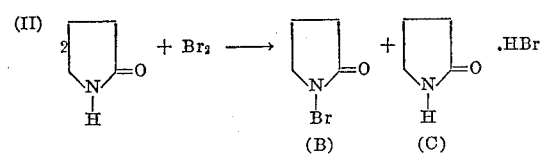

At ice temperatures, reaction I predominates and the product isolated is a mixture of compounds A and C above in such proportions that there is 4.32% ionic bromade and 43.82% available bromine in the product. Product B remains in the filtrate and is lost. The thus obtained mixture of products A and C is quite unstable, gradually losing its available bromine content over a period of time, with a corresponding build-up of the ionic bromide. Thus after one month's storage of the above product, at room temperature, it was found to contain 11.76% ionic bromide and 35.52% available bromine. Such a product forms an unreliable source of bromine for carrying out reactions as a disinfectant, germicide, etc., since it would require analysis before each use to avoid use of greater amounts than necessary in order to compensate for deterioration.

I have now found that by reacting together 2-pyrrolidinone, hydrogen bromide, and bromine in alcoholic solutions and at molar ratios respectively of 3:1:1 and at a temperature of from 0° C. to 15° C., there is obtained directly, and in excellent yield, a solid crystalline complex of bromine and 2-pyrrolidinone, having a melting point of 88–90° C. and containing approximately 32% available bromine (Br°) and approximately 16% ionic bromine (Br⁻). The presence of hydrogen bromide during the reaction appears to suppress reaction II above and minimize the formation of Compound B above, thus avoiding loss of both bromine and 2-pyrrolidinone. It is possible that this compound is a mixture or molecular complex of compounds A and C above, containing approximately 60% of product A and 40% of product C.

However, the fact that stability occurs only when the ratio of available bromine to ionic bromide (Br°:Br⁻) is approximately 2, and when the overall composition is $(C_4H_7NO)_3 \cdot HBr \cdot Br_2$, clearly points to the possibilities that (1) $Br_3^-$ species are formed, and (2) they interact with the pyrrolidone units to form a unified molecular complex, rather than a physical mixture of A and C.

The details of the present invention will be apparent from a consideration of the following specific examples thereof:

*Example 1*

Into 50 mls. of methanol were passed 9 g. of anhydrous hydrogen bromide (0.117 mole) at room temperature, 27.3 mls. (10.1 g.; 0.355 mole) of 2-pyrrolidone (gamma-butyrolactam) were added in solution in 30 mls. of methanol. This was cooled to 10° C., and 6.0 mls. (19.2 g.; 0.12 mole) of bromine added. A red crystalline solid precipitated and was filtered under suction and dried to constant weight under ca. 3 mm. Hg vacuum. There were obtained 36.3 g. of product, melting point 88–90° C. and available bromine content of 32.1%.

The elemental analysis was as follows: C, 29.35%; H, 4.55%; N, 8.47%; Br, 15.95%; total Br, 48.71%; available bromine, 32.1%.

Elemental analysis calculated for $(C_4H_7NO)_3 \cdot HBr \cdot Br_2$: C, 29.05%; H, 4.27%; N, 8.47%; Br⁻, 16.11%; total bromine 48.32%; available bromine, 32.32%.

The yield was 36.3 of a theoretical yield of 58.8 g. or 61.8%.

The following table illustrates the stability (at room temperature) of this product as followed by iodimetric determination of available bromine.

| Time stored: | Percent available bromine |
|---|---|
| 0 days | 32.1; 32.1 |
| 3 days | 32.3; 32.3 |
| 10 days | 32.1; 32.3 |
| 18 days | 32.2; 32.2 |
| 5 weeks | 32.3; 32.3 |
| 6½ weeks | 32.3; 32.3 |
| 8½ weeks | 32.1; 32.1 |
| 10½ weeks | 32.2; 32.3 |

*Example 2*

This example illustrates the successful scale up of the process of Example 1.

In a 1 liter flask 500 mls. of methanol were cooled to 0° with stirring. Anhydrous HBr was passed through the solution until 117 g. (1.44 moles) were absorbed as determined by weight loss of cylinder and by titration of the solution. The methanol was maintained at −1 to +5° C. during this operation, which required approximately 3 hours. To this solution there was added dropwise over a period of 30 minutes, 74 mls. (1.44 moles) of bromine. The temperature was maintained between −1° and +7° C. during this operation. To this solution was added 337 mls. of pyrrollidone (4.32 moles) over a period of 27 minutes. The temperature was kept between 1° and 11° C. by alternate addition and cooling. The heavy crystalline mass which resulted was filtered with suction at this time, and the partially dried residue dried to constant weight at 40 mm. of Hg at over KOH. This crop (A) weighed 611.9 g. at constant weight. The filtrates were cooled to −10° C. with solid carbon dioxide. A second crop of crystals was obtained. It weighed 41.6 g. at constant weight (B). A third crop was obtained by cooling to −40° C. with Dry Ice acetone. It weighed 21.9 g. at constant weight (C). There were 410 mls. of methanol recovered.

The following is a comparison of crops A, B, and C:

|   | Melting Point, degree | Percent Available Bromine |
|---|---|---|
| A | 87–90 | 32.1 |
| B | 87–90 | 32.1 |
| C | 87–90 | 32.1 |

The mixed melting points of A–B and of B–C were identical—87–90° C.

A yield of 675 g. of the product were obtained from a total of 717 g. of the 3 reactants, or a yield of 94% of theory.

As indicated by the foregoing examples, it is necessary to use essentially 3 moles of 2-pyrrolidinone with 1 mole each of HBr and bromine. Attempts to form complexes of bromine and 2-pyrrolidinone of the composition $(C_4H_7NO).HBr.Br_2$ and $(C_4H_7NO)_2.HBr.Br_2$ by the use of 1 and 2 molar proportions respectively, of pyrrolidinone-2 for each mole of HBr and bromine led only to the formation of unstable oils and small amounts of a compound corresponding to the empirical formula $(C_4H_7NO)_3.HBr.Br_2$. However, in the case of other lactams a stable complex of the lactam and bromine is obtained in which the ratio of available or free bromine $(Br°)$ to ionic bromide $(Br^-)$ is essentially 2:1 is produced, when the lactam hydrogen bromide and bromine, are reacted pursuant to the present invention with respectively molar ratios 2:1:1. Such complexes of bromine with other lactams and their method of preparation are more fully described and claimed in my co-pending application Serial No. 366,160, filed May 8, 1964, a division of this application.

While methanol was employed as the solvent in the foregoing examples, similar results have been obtained employing other lower primary aliphatic alcohols (alkanols) containing 1 to 4 carbon atoms, e.g. ethanol, 1-propanol, 1-butanol and isobutyl alcohol (2-ethyl-1-propanol). However, secondary and tertiary alcohols, such as isopropyl alcohol, sec. butyl alcohol and tert. butyl alcohol are preferably avoided since they will react with the bromine and thus the concentration of HBr cannot be controlled, low bromide concentration would lead to an unstable product, while a high bromide concentration would not have any beneficial effect and would be wasted.

It has been found that the novel product of the present invention can be diluted with inert solid materials so as to form dry, free-flowing powders, or if desired, the diluted material can be pressed into solids containing a predetermined amount of bromine. Sutable diluents for this purpose include kaolin, sodium sulfate, calcium silicate, aluminum silicate, and the like. When the material is to be pelleted, the incorporation of a small amount of polyvinylpyrrolidone would be advantageous to serve as a binder.

It will be recognized that the novel products of the present invention represent a safe and convenient way of "carrying" bromine and of particular advantage in applications where the use of elemental bromine might be hazardous or difficult. For example; as a germicide for swimming pools, where metering apparatus could be dispersed with; in oil well drilling to kill metal corroding bacteria; to kill weeds, mosquito larvae, etc.; for organic brominations in which elemental bromine is too active; as an analytical reagent in which bromine could be efficiently and accurately weighed out.

I claim:

The process of producing a solid crystalline stable complex of bromine and 2-pyrrolidone, which comprises reacting in solution in a primary lower aliphatic alcohol containing 1–4 carbon atoms and at a temperature of from 0–15° C., 3 molecular proportions of said 2-pyrrolidone, with 1 molecular proportion of HBr and 1 molecular proportion of elemental bromine and recovering the thus formed complex of bromine and said 2-pyrrolidone, said complex being characterized by its stability and a ratio of free bromine to ionic bromine of essentially 2:1.

No references cited.

UNITED STATES PATENT OFFICE
CERTIFICATE OF CORRECTION

March 23, 1965

Patent No. 3,174,980

Wiley Edgar Daniels

It is hereby certified that error appears in the above numbered patent requiring correction and that the said Letters Patent should read as corrected below.

Column 1, lines 29 to 34, in the formula, after the closing bracket insert the subscript -- 2 --; column 2, line 64, for "pyrrollidone" read -- pyrrolidone --.

Signed and sealed this 24th day of August 1965.

(SEAL)
Attest:

ERNEST W. SWIDER
Attesting Officer

EDWARD J. BRENNER
Commissioner of Patents